(12) United States Patent
Morein et al.

(10) Patent No.: US 9,898,150 B2
(45) Date of Patent: Feb. 20, 2018

(54) SOURCE DRIVER UPLINK AS INDICATOR OF DOWNLINK STATUS

(71) Applicant: SYNAPTICS INCORPORATED, San Jose, CA (US)

(72) Inventors: Stephen L. Morein, San Jose, CA (US); Prashant Shamarao, Cupertino, CA (US); Zhibing Liu, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 308 days.

(21) Appl. No.: 14/751,429

(22) Filed: Jun. 26, 2015

(65) Prior Publication Data

US 2016/0195947 A1 Jul. 7, 2016

Related U.S. Application Data

(60) Provisional application No. 62/100,034, filed on Jan. 5, 2015.

(51) Int. Cl.
*G06F 3/041* (2006.01)
*G06F 3/044* (2006.01)

(52) U.S. Cl.
CPC .......... *G06F 3/044* (2013.01); *G06F 3/0416* (2013.01)

(58) Field of Classification Search
CPC .................. G06F 3/0416; G09G 3/3611
See application file for complete search history.

(56) References Cited

U.S. PATENT DOCUMENTS

| | | | |
|---|---|---|---|
| 7,965,670 B2 | 6/2011 | Wang | |
| 8,705,571 B2 | 4/2014 | Anderson et al. | |
| 2008/0219292 A1 | 9/2008 | Wang | |
| 2009/0303224 A1 | 12/2009 | Yoshida | |
| 2012/0281027 A1 | 11/2012 | Kim | |
| 2013/0088531 A1* | 4/2013 | Su | G09G 3/3611 345/691 |
| 2014/0198560 A1 | 7/2014 | Lee et al. | |
| 2015/0346887 A1* | 12/2015 | Cho | G06F 3/0412 345/174 |

FOREIGN PATENT DOCUMENTS

CN 101364388 B 10/2012

* cited by examiner

*Primary Examiner* — Albert Wang
(74) *Attorney, Agent, or Firm* — Patterson + Sheridan, LLP (57) ABSTRACT

In one embodiment, a system includes one or more source drivers operable to drive a portion of a row or column of a display. The system also includes a timing controller coupled to each of the one or more source drivers and configured to control the one or more source drivers. The system further includes a downstream link for each of the one or more source drivers, configured to transfer data from the timing controller to one of the one or more source drivers. The system also includes an upstream link for each of the one or more source drivers, configured to transfer uplink data from one of the one or more source drivers to the timing controller, wherein the uplink data includes at least one of downlink lock status information and touch data.

20 Claims, 5 Drawing Sheets

SOURCE DRIVER UPLINK AS INDICATOR OF DOWNLINK STATUS

CROSS-REFERENCE TO RELATED APPLICATIONS

This application claims benefit of U.S. Provisional Patent Application Ser. No. 62/100,034, filed Jan. 5, 2015, which is incorporated by reference in its entirety.

BACKGROUND

Field of the Disclosure

Embodiments of the present invention generally relate to a method and apparatus for touch sensing, and more specifically, an upstream link that indicates link status of a downstream link.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments described herein include a processing system for operating an input device and a method for determining downlink status via an upstream link.

In one embodiment, a processing system for operating an input device includes a timing controller, where the timing controller is coupled to one or more source drivers of a display and configured to control the one or more source drivers. The system includes a downstream link for each of the one or more source drivers, each of the downstream links configured to transfer data from the timing controller to one of the one or more source drivers. The system further includes an upstream link for each of the one or more source drivers, each of the upstream links configured to transfer uplink data from one of the one or more source drivers to the timing controller, wherein the uplink data includes at least one of downlink lock status information and touch data.

In another embodiment, a processing system for operating an input device includes one or more source drivers, each of the one or more source drivers operable to drive at least a portion of a row or column of a display. The system also includes a timing controller, the timing controller coupled to each of the one or more source drivers and configured to control the one or more source drivers. The system further includes a downstream link for each of the one or more source drivers, each of the downstream links configured to transfer data from the timing controller to one of the one or more source drivers. The system also includes an upstream link for each of the one or more source drivers, each of the upstream links configured to transfer uplink data from one of the one or more source drivers to the timing controller, wherein the uplink data includes at least one of downlink lock status information and touch data.

In another embodiment, a method for operating an input device includes asserting a signal high on an upstream link after a power-on procedure, the upstream link configured to transfer uplink data from a single source driver of a display device to a timing controller. The method further includes locking the single source driver to a downstream link signal from the timing controller via link training on a downstream link. The method also includes, after the single source driver is locked to the downstream link signal, pulling the upstream link signal low when no data transmission is occurring on the upstream link. Finally, the method includes asserting the upstream link signal high whenever lock is lost.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously indicate lock status of a downstream link via an uplink signal. Embodiments herein also utilize a point-to-point interface between a timing controller and one or more source drivers.

Figure 1:
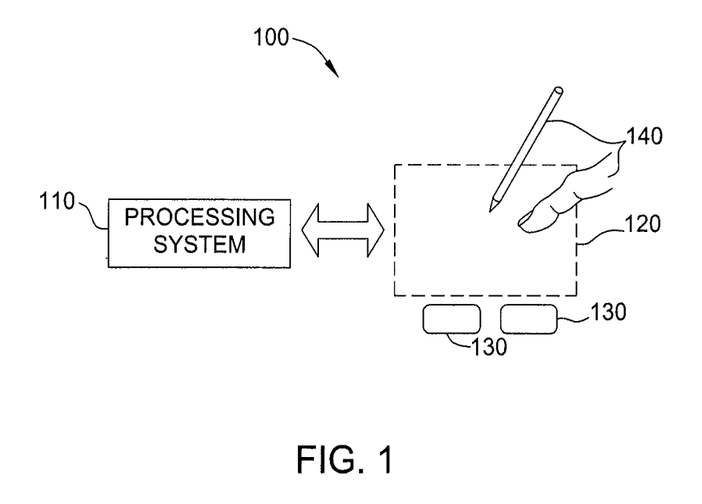
FIG. 1 is a block diagram of a system that includes an input device according to an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
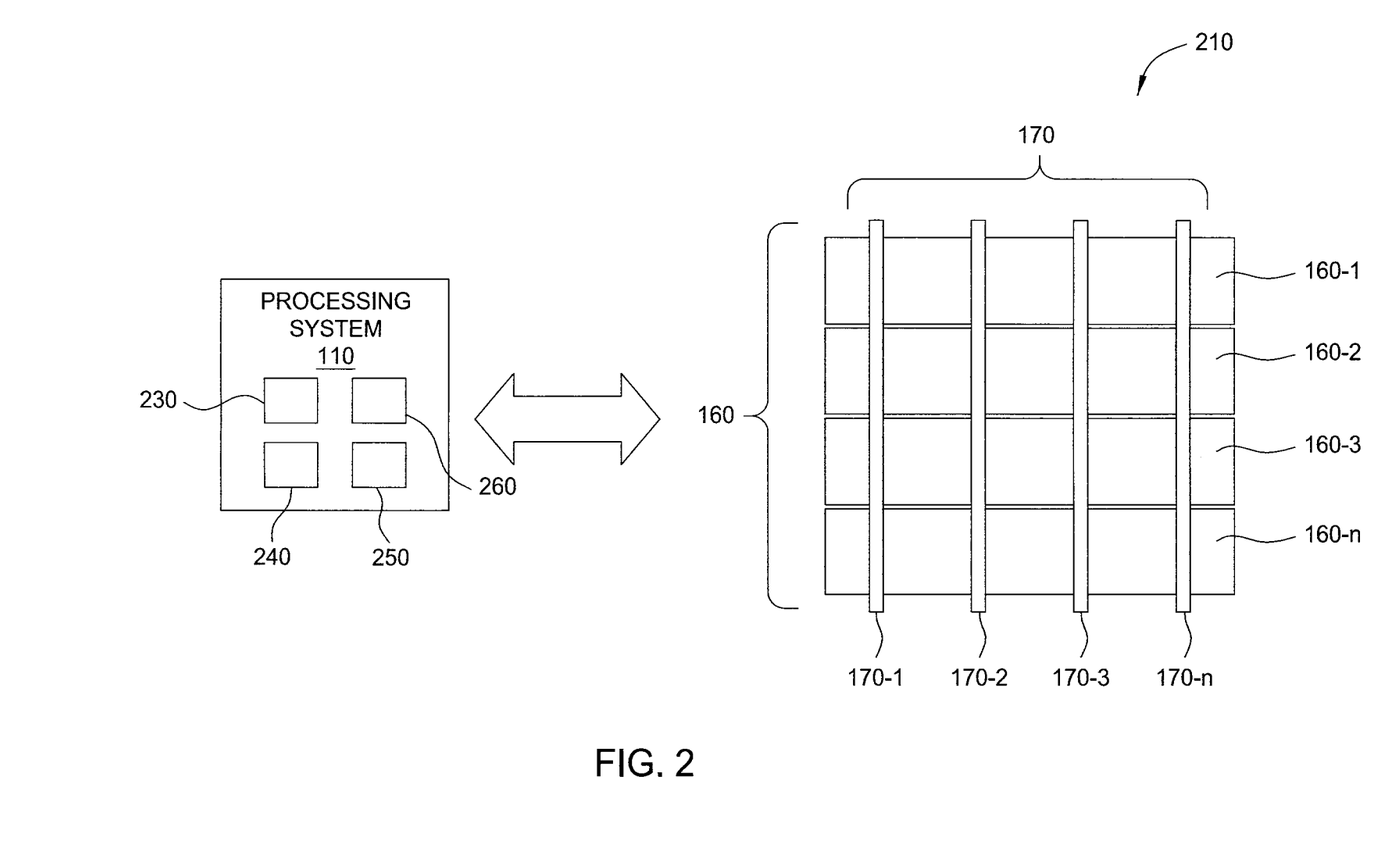
FIG. 2 is an example sensor electrode pattern and processing system according to an embodiment.

FIG. 2 illustrates a system 200 including a processing system 110 and a portion of an example sensor electrode pattern configured to sense in a sensing region associated with the pattern, according to some embodiments. For clarity of illustration and description, FIG. 2 shows a pattern of simple rectangles illustrating sensor electrodes, and does not show various components. This sensor electrode pattern comprises a plurality of transmitter electrodes 160 (160-1, 160-2, 160-3, . . . 160-$n$), and a plurality of receiver electrodes 170 (170-1, 170-2, 170-3, . . . 170-$n$) disposed over the plurality of transmitter electrodes 160.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 160 comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., In Plan Switching (IPS) or Plan to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 160 comprises one or more common electrodes. In other embodiments, at least two transmitter electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Processing system 110 may include a driver module 230, a receiver module 240, a determination module 250, and an optional memory 260. The processing system 110 is coupled to receiver electrodes 170 and transmitter electrodes 160 through a plurality of conductive routing traces (not shown in FIG. 2).

The receiver module 240 is coupled to the plurality of receiver electrodes 170 and configured to receive resulting signals indicative of input (or lack of input) in the sensing region 120 and/or of environmental interference. The receiver module 240 may also be configured to pass the resulting signals to the determination module 250 for determining the presence of an input object and/or to the optional memory 260 for storage. In various embodiments, the IC of the processing system 110 may be coupled to drivers for driving the transmitter electrodes 160. The drivers may be fabricated using thin-film-transistors (TFT) and may comprise switches, combinatorial logic, multiplexers, and other selection and control logic.

The driver module 230, which includes driver circuitry, included in the processing system 110 may be configured for updating images on the display screen of a display device (not shown). For example, the driver circuitry may include display circuitry and/or sensor circuitry configured to apply one or more pixel voltages to the display pixel electrodes through pixel source drivers. The display and/or sensor circuitry may also be configured to apply one or more common drive voltages to the common electrodes to update the display screen. In addition, the processing system 110 is configured to operate the common electrodes as transmitter electrodes for input sensing by driving transmitter signals onto the common electrodes.

The processing system 110 may be implemented with one or more ICs to control the various components in the input device. For example, the functions of the IC of the processing system 110 may be implemented in more than one integrated circuit that can control the display module elements (e.g., common electrodes) and drive transmitter signals and/or receive resulting signals received from the array of sensing elements. In embodiments where there is more than one IC of the processing system 110, communications between separate processing system ICs 110 may be achieved through a synchronization mechanism, which sequences the signals provided to the transmitter electrodes 160. Alternatively the synchronization mechanism may be internal to any one of the ICs.

Figure 3:
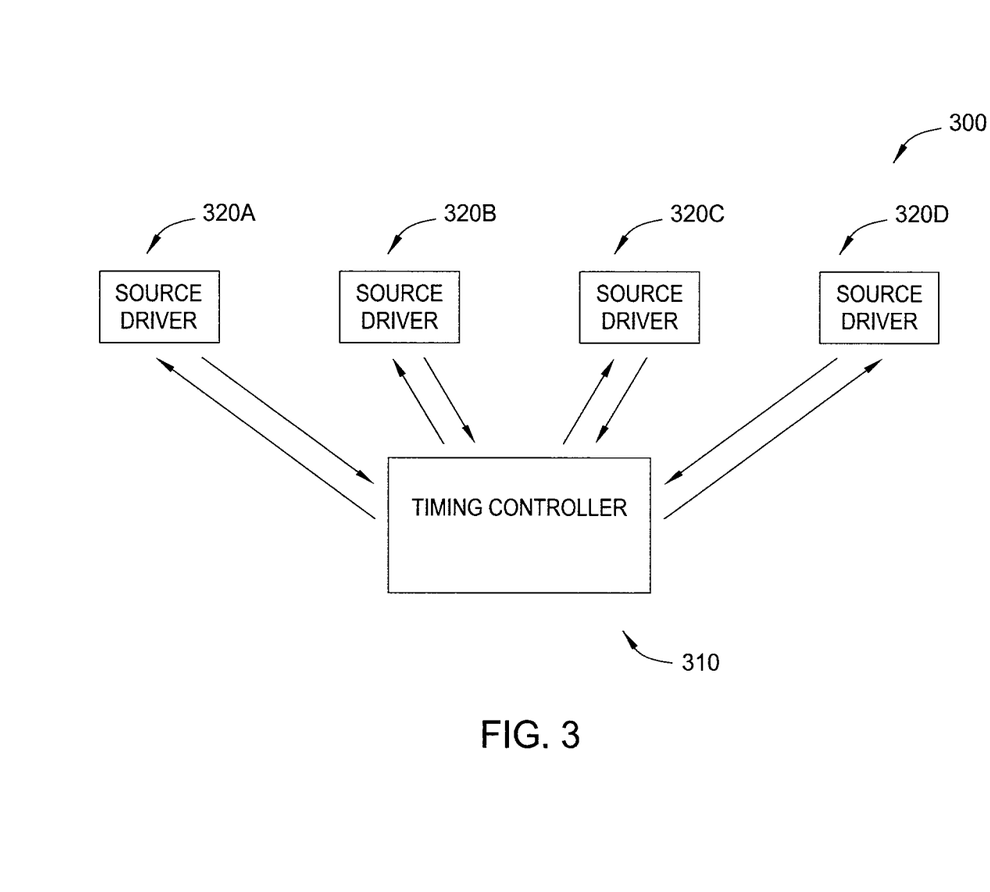
FIG. 3 illustrates an example diagram of a timing controller and source drivers, according to one embodiment.

FIG. 3 illustrates a system 300 for interfacing a timing controller 310 with one or more source drivers 320 according to one embodiment of the present invention. System 300 utilizes both an uplink and a downlink from timing controller 310 to each source driver 320. The uplinks (shown as arrows from source drivers 320A-320D to timing controller 310) provide touch data to timing controller 310. The downlinks (shown as arrows from timing controller 310 to source drivers 320A-320D) provide image data from the timing controller 310 to source drivers 320. While components 320 are referred to as "source drivers" in this disclosure, each component 320 may include more than a source driver, such as an analog front end or circuitry to pull a signal high or low, in accordance with embodiments described herein.

Timing controller 310 controls the operation timing of source drivers 320 with a timing signal. The connections between timing controller 310 and each source driver 320 need to be locked so that data can be sent to the display. A locked link ensures that clocks are synchronized and the frame alignment of the transmitted data is known. One or more links may lose lock due to noise, electrostatic discharge, protocol error, or for other reasons. When lock on a link is lost, timing controller 310 needs to know that lock is lost so that the timing controller can reestablish lock on the link to the source driver that has lost lock. In this embodiment, the uplink from source driver 320 to timing controller 310 can be used to notify timing controller 310 that lock is lost. In addition, since each source driver 320 has its own uplink to timing controller 310, timing controller 310 is notified which link has lost lock and can then reestablish lock on that link, without disturbing other links. If a separate "daisy chain" lock signal that connected the source drivers together was used instead of the this embodiment, timing controller 310 would not know which link had lost lock, and all links would need to be retrained to regain lock.

System 300 obviates the need for a separate lock signal by utilizing the uplink signal to inform timing controller 310 that lock has been lost. This solution eliminates a separate daisy chain wire between source drivers to transmit lock status. Another benefit is reducing the number of pins (not shown) on the timing controller 310. Display artifacts may also be reduced by only retraining those source drivers 320 that have lost lock instead of retraining all source drivers.

System 300 notifies timing controller 310 that lock has been lost by driving the uplink signal high when lock is lost. Circuitry associated with or in component 320 is used to drive the uplink high and keep it high when lock is lost. Because data on the uplink switches between high and low regularly in normal operation, a predetermined number of high signals in a row received by timing controller 310 indicates that lock has been lost. For example, following a protocol may mean that the uplink switch is high for no more than 8 cycles in a row according to an example embodiment. If the uplink of any source driver 320 is high for more than 8 cycles in a row, the system 300 determines that lock is lost since the communication protocol is no longer being followed. In response, the system may initiate retraining.

Once lock has been lost, timing controller 310 can initiate a training pattern for the link that has lost lock. The training pattern is transmitted to recover the clock on the link, and then other training activities may be performed, such as phase adjustment. Any clock recovery scheme is applicable to the embodiments described herein. After the source driver is locked to the downstream link signal, the upstream link signal is pulled low by circuitry in component 320. Timing controller 310 then receives low signals and recognizes that lock has occurred, stops link training, and instructs the source driver 320 to begin standard operation. In standard operation, the circuitry pulls the upstream link low when there is no link training or valid packet data transmission occurring.

Figure 4:
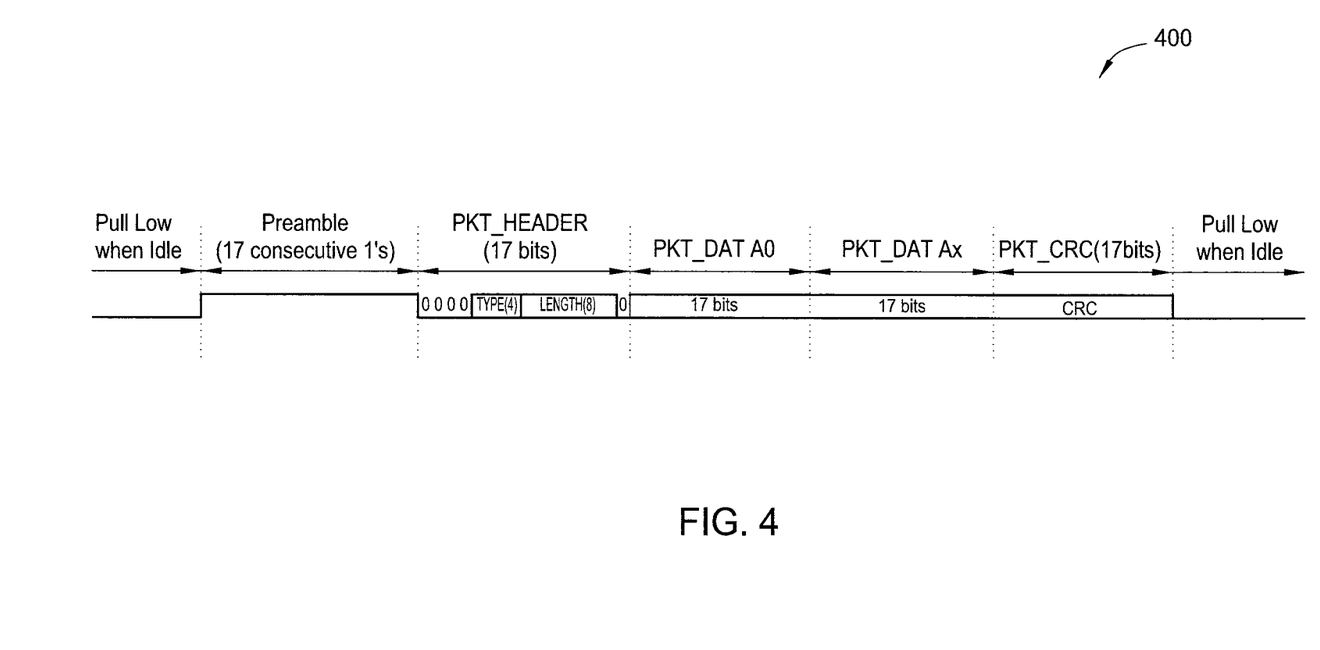
FIG. 4 illustrates an example bit string from a source driver, according to one embodiment.

FIG. 4 illustrates an example bit string 400 on an uplink from a source driver to a timing controller according to one embodiment. As shown, the bit string is pulled low when idle (see the beginning and end of the bit string). After a preamble, a packet header is transmitted (PKT_HEADER). Then, any number of data packets are transmitted (two are shown here), followed by a PKT_CRC (cyclic redundancy check). After the CRC, the bit string is again pulled low.

One method for determining link status, as noted above, is to transmit a predetermined number of high bits on the upstream link. In a first example coding scheme, valid data patterns comprise 16 bits of data followed by a zero transmitted on the uplink. Therefore, if more than 17 high bits in a row are received on a specific link by timing controller 310, that link has lost lock; i.e., circuitry has pulled the bit string high. In this coding scheme, each PKT_DAT illustrated in bit string 400 will end with a zero. PKT_HEADER also ends with a zero in this coding scheme, and the bit string is pulled low when idle. If more than 17 high bits in a row are received by timing controller 310, valid packets are not being transmitted, and therefore timing controller 310 initiates link training on that link.

In a second example coding scheme, a low bit could be anywhere in the coding scheme for each data packet, but the low bit is not necessarily at the end of the packet. Therefore, in a worst case scenario, a first data packet of length N begins with a 0 followed by N−1 1's. The next data packet of length N begins with N−1 1's, and that data packet ends with a 0. In this scenario, the most 1's in a row that could be valid is 2N−2. Specifically, if the data packet was 17 bits in length (N=17), the first data packet would begin with a 0 followed by sixteen 1's, and the next data packet would begin with sixteen 1's followed by a 0. Thus 2N−2=32, and more than thirty-two 1's in a row would indicate that the link has lost lock in this example.

Other coding schemes may be used in various embodiments. As long as a 0 occurs somewhere in a valid data packet, circuitry that pulls the bit string high when lock has been lost on a link will notify timing controller 310 that link training needs to be performed on that link, according to some embodiments.

Figure 5:
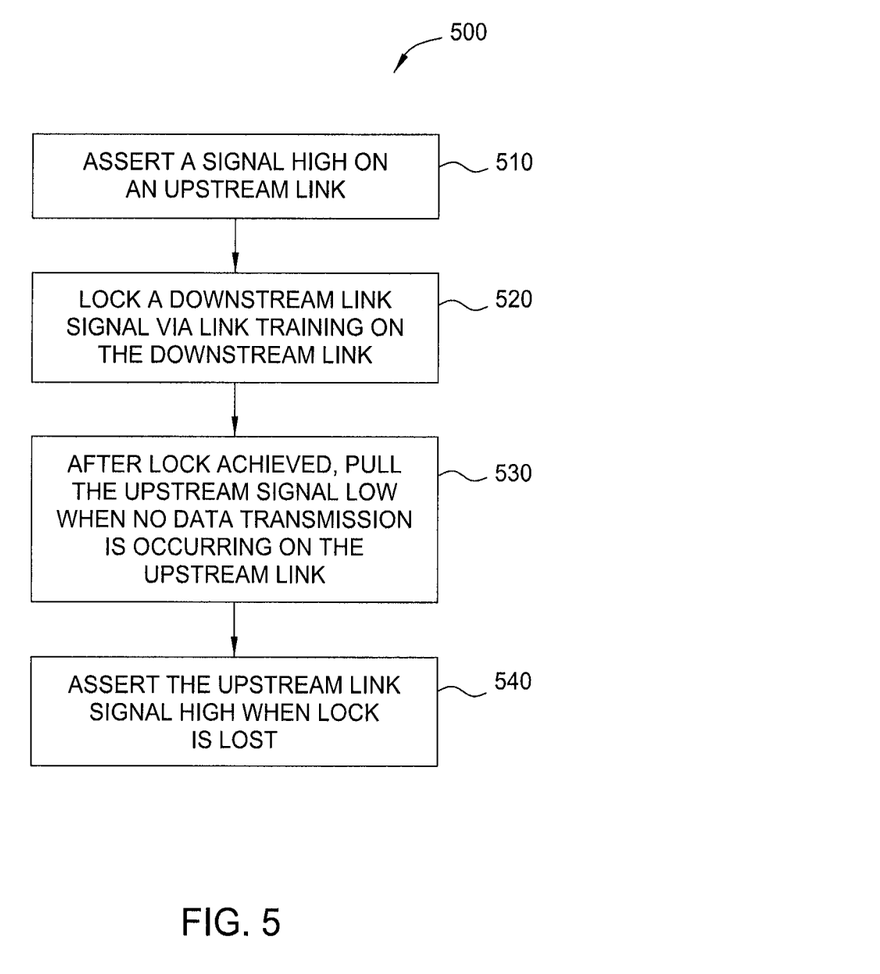
FIG. 5 is a flow diagram illustrating a method for operating an input device, according to one embodiment.

FIG. 5 is a flow diagram illustrating a method 500 for indicating lock status in accordance with one embodiment of the invention. The method 500 begins at step 510, where a signal is asserted high on an upstream link. As noted above, circuitry can be used to assert the signal high at various times, including at startup of the system and when lock is lost.

As step 520, a downstream link signal is locked via link training on the downstream link. A timing controller can perform link training on the link to achieve lock. Any suitable link training scheme may be utilized.

The method proceeds to step 530 after lock is achieved. At step 530, the upstream link signal is pulled low when no data transmission is occurring on the upstream link. Circuitry can be used to assert the signal low at this step.

The method concludes with step 540. At step 540, the upstream link signal is asserted high when lock is lost. Circuitry can pull the signal high when lock is lost. As discussed above, when the signal is high, high bits are transmitted on the upstream link to the timing controller. After a predetermined number of high bits are received by the timing controller, the timing controller initiates link training to recover lock on the link.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A processing system for operating an input device, comprising:
a timing controller, the timing controller coupled to one or more source drivers of a display and configured to control the one or more source drivers;
a downstream link for each of the one or more source drivers, each of the downstream links configured to transfer data from the timing controller to one of the one or more source drivers; and
an upstream link for each of the one or more source drivers, each of the upstream links configured to transfer uplink data from one of the one or more source drivers to the timing controller, wherein the uplink data includes downlink lock status information and touch data.

2. The processing system of claim 1, wherein each upstream link couples to only a single source driver.

3. The processing system of claim 1, wherein each upstream link is coupled directly from the one of the one or more source drivers to the timing controller.

4. The processing system of claim 1, wherein the timing controller is configured to determine which of the one or more source drivers has successful downlink lock based on the lock status information.

5. The processing system of claim 1, wherein the timing controller is configured to determine lock status based on a predetermined number of consecutive high or low values in the uplink data.

6. The processing system of claim 1, wherein the timing controller is configured to instruct a source driver of the one or more source drivers, via the downstream link, to initiate link training in response to the lock status information indicating a lack of lock.

7. The processing system of claim 1, wherein the timing controller is configured to determine presence of an input object in a sensing region in response to the touch data received over the upstream link.

8. A processing system for operating an input device, comprising:
one or more source drivers, each of the one or more source drivers operable to drive at least a portion of a row or column of a display;
a timing controller, the timing controller coupled to each of the one or more source drivers and configured to control the one or more source drivers;
a downstream link for each of the one or more source drivers, each of the downstream links configured to transfer data from the timing controller to one of the one or more source drivers; and
an upstream link for each of the one or more source drivers, each of the upstream links configured to transfer uplink data from one of the one or more source drivers to the timing controller, wherein the uplink data includes downlink lock status information and touch data.

9. The processing system of claim 8, wherein each upstream link couples to only a single source driver.

10. The processing system of claim 8, wherein each upstream link is coupled directly from the one of the one or more source drivers to the timing controller.

11. The processing system of claim 8, wherein the timing controller is configured to determine which of the one or more source drivers has successful downlink lock based on the lock status information.

12. The processing system of claim 8, wherein the timing controller is configured to determine lock status based on a predetermined number of consecutive high or low values in the uplink data.

13. The processing system of claim 8, wherein the timing controller is configured to instruct a source driver of the one or more source drivers, via the downstream link, to initiate link training in response to the lock status information indicating a lack of lock.

14. The processing system of claim 8, wherein the timing controller is configured to determine presence of an input object in a sensing region in response to the touch data received over the upstream link.

15. A method for operating an input device, comprising:
asserting a signal high on an upstream link after a power-on procedure, the upstream link configured to transfer uplink data from a single source driver of a display device to a timing controller, wherein the uplink data includes downlink lock status information and touch data;
locking the single source driver to a downstream link signal from the timing controller via link training on a downstream link;
after the single source driver is locked to the downstream link signal, pulling the upstream link signal low when no data transmission is occurring on the upstream link; and
asserting the upstream link signal high whenever lock is lost.

16. The method of claim 15, further comprising:
performing link training for the downstream link after a predetermined number of high values are transmitted via the upstream link.

17. The method of claim 16, wherein link training is performed after more than seventeen consecutive high values are transmitted via the upstream link.

18. The method of claim 16, wherein N is the number of bits of data in a coding scheme, and link training is performed after more than 2N−2 consecutive high values are transmitted via the upstream link.

19. The method of claim 15, wherein the touch data indicates presence of an input object in a sensing region.

20. The method of claim 15, further comprising:
determining the lock status of a second source driver via a second upstream link.

* * * * *